United States Patent
Hwang et al.

(10) Patent No.: US 11,787,254 B2
(45) Date of Patent: Oct. 17, 2023

(54) INTEGRATED SHOCK AND SUSPENSION HEIGHT SENSOR

(71) Applicant: Ford Global Technologies, LLC, Dearborn, MI (US)

(72) Inventors: Steven Hwang, Ypsilanti, MI (US); William Wong, Garden City, MI (US); Edmund Scott Anderson, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/534,100

(22) Filed: Nov. 23, 2021

(65) Prior Publication Data

US 2023/0158850 A1    May 25, 2023

(51) Int. Cl.
*B60G 13/00* (2006.01)
*F16F 9/38* (2006.01)

(52) U.S. Cl.
CPC .............. *B60G 13/003* (2013.01); *F16F 9/38* (2013.01); *B60G 2204/112* (2013.01); *B60G 2400/252* (2013.01)

(58) Field of Classification Search
CPC ............ B60G 13/003; B60G 2204/112; B60G 2400/252; F16F 9/38
See application file for complete search history.

(56) References Cited

U.S. PATENT DOCUMENTS

| | | | |
|---|---|---|---|
| 4,822,063 A | 4/1989 | Yopp et al. | |
| 5,251,729 A | 10/1993 | Nehl et al. | |
| 7,654,370 B2 | 2/2010 | Cubalchini, Jr. | |
| 2002/0100649 A1 | 8/2002 | Agrotis et al. | |
| 2003/0197502 A1* | 10/2003 | Nyce | G01D 5/485 324/207.13 |
| 2004/0089506 A1* | 5/2004 | Nehl | G01P 3/52 188/267 |
| 2008/0189010 A1* | 8/2008 | Cubalchini | F16F 9/38 324/207.13 |
| 2018/0345749 A1* | 12/2018 | Dunaway | F16F 9/19 |
| 2020/0011394 A1* | 1/2020 | Närdemann | F16F 9/38 |
| 2020/0298646 A1* | 9/2020 | Anderson | B60G 17/019 |

FOREIGN PATENT DOCUMENTS

DE   102019206206 A1 * 11/2020
JP   H0694404 A    4/1994

* cited by examiner

*Primary Examiner* — Nicole T Verley
(74) *Attorney, Agent, or Firm* — BURR & FORMAN LLP; Lorne Forsythe (57) ABSTRACT

A shock absorber for a vehicle suspension system may include a damper tube defining an axis, a rod operably coupled to the damper tube to be movable along the axis relative to the damper tube in response to jounce and rebound events, a dust boot operably coupled to the rod and extending along peripheral sides of the rod and at least a proximal end of the damper tube relative to the rod, the dust boot being movable with the rod, a target disposed on a damper bump cap operably coupled to the proximal end of the damper tube, and a measurement assembly affixed to the dust boot. The measurement assembly may include a PCB elongated parallel to the axis to track relative movement between the target and the measurement assembly responsive to the jounce and rebound events to generate ride height information based on the relative movement.

13 Claims, 6 Drawing Sheets

INTEGRATED SHOCK AND SUSPENSION HEIGHT SENSOR

TECHNICAL FIELD

Example embodiments generally relate to vehicle suspension and, more particularly, relate to a suspension system with an integrated shock and suspension height sensor.

BACKGROUND

Vehicles commonly employ independent suspension that allows each wheel to move relative to the vehicle chassis independent of the other wheels. The components and geometries used for independent suspension designs can vary to some degree. However, a typical independent suspension system will employ dampers or shock absorbers (or simply "shocks") that are designed to provide damping for pitch (i.e., oscillation about a lateral axis of the vehicle). The shocks generally resist compression and rebound with damping forces that are applied over a range of travel of a piston rod.

The shocks selected for a particular vehicle are generally chosen based on the expectation of normal pitch scenarios that are encountered during routine driving conditions. Some typical suspension components that may be considered for selection include springs and dampers (e.g., gas shocks). Moreover, some shocks employ what is referred to as a coil-over design in which a coil spring is provided coaxial with the damper such that the damper is inside the coil spring. Regardless of the specific type of shock, some shock designs include a form of dust gaiter or bellows that is used to prevent dust, dirt or debris from fouling the interface between the rod and the damper tube of the damper or shock. In a typical situation, a bumper cap may also be used to prevent debris from entering the damper tube. These components typically move relative to each other and, in the past, certain designs have been implemented to utilize such components for measuring damper position. However, such designs have typically included many magnets displayed in a linear array that increases complexity of the componentry involved.

BRIEF SUMMARY OF SOME EXAMPLES

In accordance with an example embodiment, a shock absorber for a vehicle suspension system may be provided. The shock absorber may include a damper tube defining an axis, a rod operably coupled to the damper tube to be movable along the axis relative to the damper tube in response to jounce and rebound events, a dust boot operably coupled to the rod and extending along peripheral sides of the rod and at least a proximal end of the damper tube relative to the rod, the dust boot being movable with the rod, a target disposed on a damper bump cap operably coupled to the proximal end of the damper tube, and a measurement assembly affixed to the dust boot. The measurement assembly may include a PCB elongated parallel to the axis to track relative movement between the target and the measurement assembly responsive to the jounce and rebound events to generate ride height information based on the relative movement.

In yet another example embodiment, a suspension system for a vehicle may be provided. The suspension system may include a chassis, a wheel, and a shock absorber operably coupling the chassis and the wheel. The shock absorber may include a damper tube operably coupled to the wheel and defining an axis, a rod operably coupled to the chassis and the damper tube to be movable along the axis relative to the damper tube in response to jounce and rebound events, a dust boot operably coupled to the rod and extending along peripheral sides of the rod and at least a proximal end of the damper tube relative to the rod, the dust boot being movable with the rod, a target disposed on a damper bump cap operably coupled to the proximal end of the damper tube, and a measurement assembly affixed to the dust boot. The measurement assembly may include a PCB elongated parallel to the axis to track relative movement between the target and the measurement assembly responsive to the jounce and rebound events to generate ride height information based on the relative movement.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

Some example embodiments described herein may address the problems described above. In this regard, for example, some embodiments may provide an improved shock or suspension system design that employs position sensors that are configured to measure ride height into existing components. In this regard, for example, some embodiments may provide for a target that may be installed on a first suspension component (e.g., a damper bumper cap (or bump cap)), and a measurement assembly (e.g., in the form of an elongated printed circuit board (PCB) with wiring assemblys thereon) that is provided on another suspension component that moves in a linear fashion (e.g., a dust boot, or dust gaiter). As a result, movement of the first and second suspension components relative to each other may be measured and converted into information on ride height based on such movement to effectively instantiate an integrated ride height sensor that is relatively simple in construction, but also accurate in operation.

Figure 1:
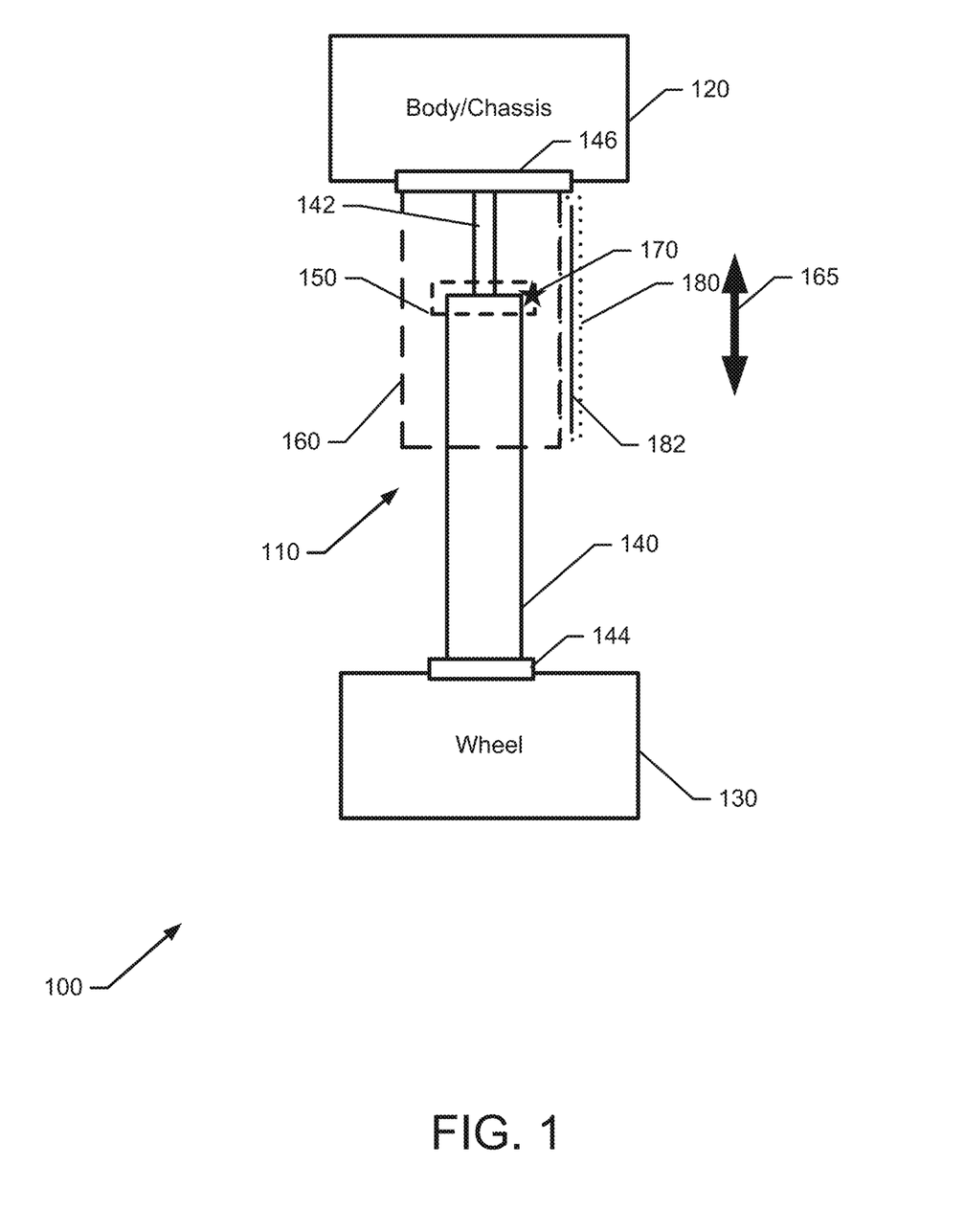
FIG. 1 illustrates a block diagram of a portion of a vehicle suspension system in accordance with an example embodiment.

FIG. 1 illustrates a block diagram of a vehicle suspension system 100 employing a damper 110. The suspension system 100 employs the damper 110 to dampen jounce and rebound forces that may be initiated between a body or chassis 120 of the vehicle and a wheel 130 (or wheel assembly components). In this regard, the damper 110 operably couples the chassis 120 to the wheel 130. The damper 110 may include a strut module or damper tube 140 with a rod 142 that extends into the damper tube 140. The damper tube 140 may be operably coupled to the wheel 130 via a first mechanical interface 144. The rod 142 may be operably coupled to the body chassis 120 via a second mechanical interface 146. The rod 142 may also be operably coupled to the damper tube 140 in such a way as to resist movement of the rod 142 via gas, fluid, springs, or other damping media that may be disposed within the damper tube 140. In some cases, coil-over springs may be further added to enhance such resistance.

It may be desirable to prevent any dust or debris from getting into the interface between the rod 142 and the damper tube 140. To provide a seal against such dust or debris, a damper bump cap 150 may be provided. In some cases, further assistance in prevention of the introduction of dust or debris may be provided by the provision of a dust boot (or dust gaiter or bellows) 160. The dust boot 160 may be affixed to the damper tube 140 via the second mechanical interface 146 and extend to cover all exposed portions of the rod 142 and beyond the damper bump cap 150 alongside the damper tube 140.

As the suspension system 100 encounters compression and extension due to jounce and rebound associated with traversing uneven surfaces, the rod 142 may be plunged further into the damper tube 140 and alternately extend farther out of the damper tube 140, respectively, relative to the position shown in FIG. 1. Such movements will therefore carry the dust boot 160 down and up according to the alternate directions of double arrow 165. By measuring such movement, it may be possible to determine ride height for the corresponding wheel or corner of a vehicle employing the suspension system 100.

As noted above, some complicated designs are already in place to try to measure this movement. However, such designs add many parts to those generally shown in FIG. 1, and are therefore complicated and expensive to employ. Moreover, many such designs do not provide linear outputs that are reliably accurate. Meanwhile, example embodiments may integrate measurement components into the components shown in FIG. 1 to provide cheaper and better performing ride height measurement for the suspension system 100.

In this regard, as shown in FIG. 1, a target 170 may be installed in or attached to the damper bump cap 150. The target 170 may, for example, generate a magnetic field that is of a known magnitude, and at a known location (i.e., at the corresponding portion of the damper bump cap 150, and at a fixed position relative to the damper tube 140). Meanwhile, a measurement assembly 180 may be disposed along a length of the dust boot 160. As the dust boot 160 moves up or down responsive to jounce and rebound, the location of the target 170 correspondingly moves relative to the measurement assembly 180. The measurement assembly 180 may be configured to track such movement and ride height information may correspondingly be determined based on such movement.

In an example embodiment, the measurement assembly 180 may be embodied as an elongated PCB that extends along a surface of the dust boot 160. Moreover, in some cases, the PCB may include, carry or be in communication with a wiring assembly 182. The wiring assembly 182 may have a current run therethrough, and the current may generate a corresponding magnetic field. The magnetic field generated by the wiring assembly 182 may be interacted with by the magnetic field of the target 170. For example, the target 170 may distort the magnetic field generated by the wiring assembly 182. The distortion or modification of the magnetic field of the wiring assembly 182 may be measured/monitored by the PCB of the measurement assembly 180, and a corresponding ride height information determination may be made by the PCB (or another processing component operably coupled thereto).

In an example embodiment, the target 170 may be integrated into the damper bump cap 150, and the measurement assembly 180 may be integrated into the dust boot 160. Integration of the target 170 into the damper bump cap 150, and the measurement assembly 180 into the dust boot 160 may simplify the design of the corresponding integrated ride height sensor that results from the structures described above.

Figure 2:
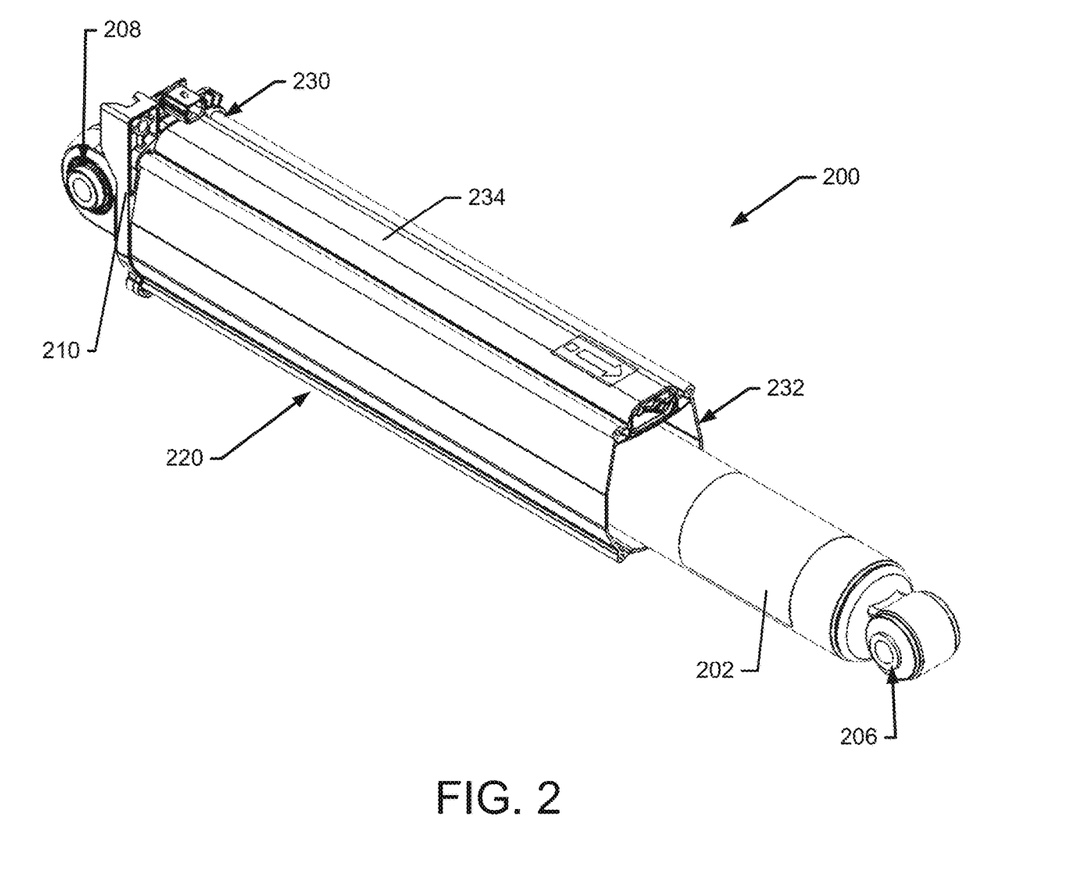
FIG. 2 illustrates a perspective view of a shock absorber assembly in accordance with an example embodiment.
Figure 3:
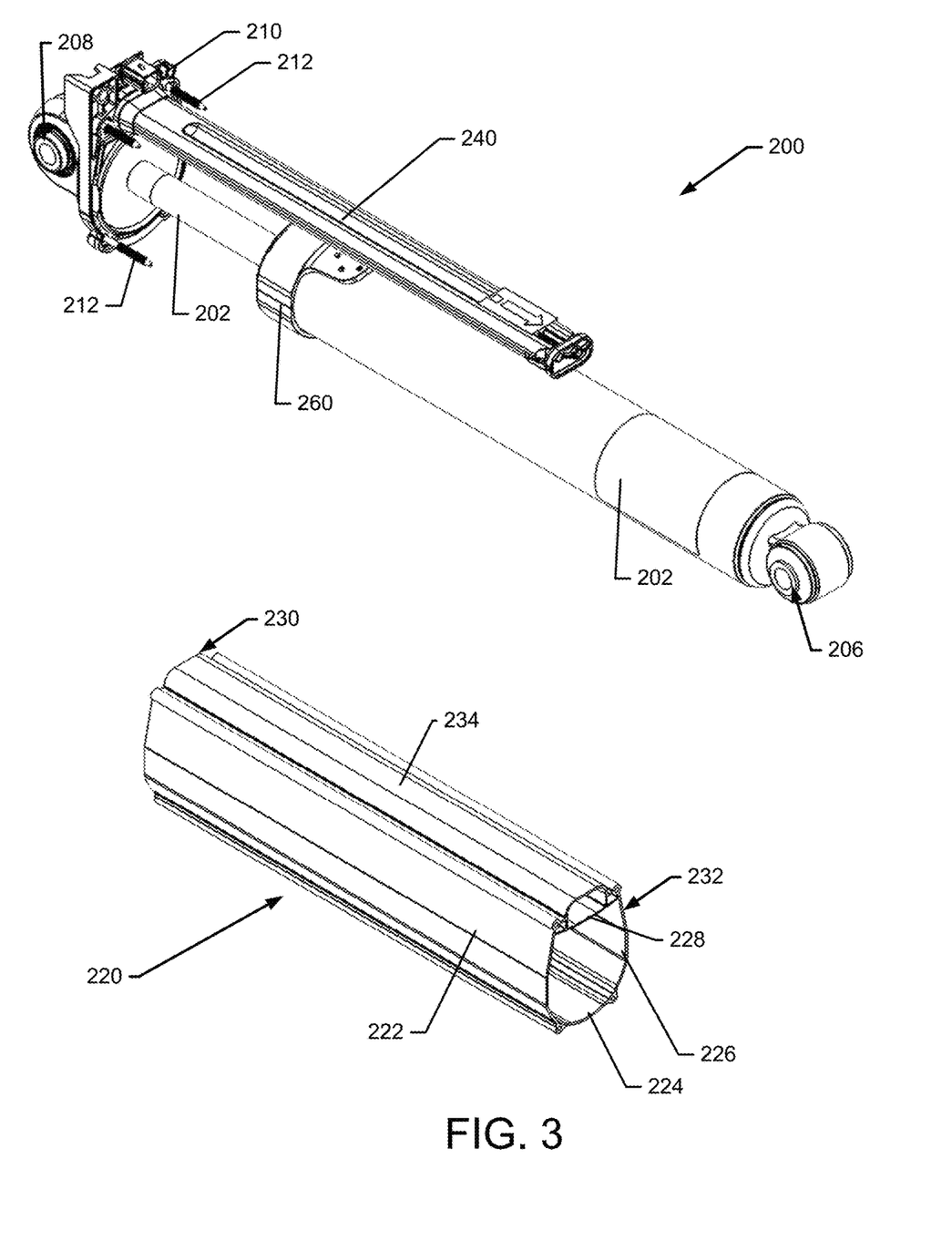
FIG. 3 is a partially exploded view of the shock absorber assembly of FIG. 2 with a dust boot removed to expose components otherwise covered by the dust boot in accordance with an example embodiment.
Figure 4:
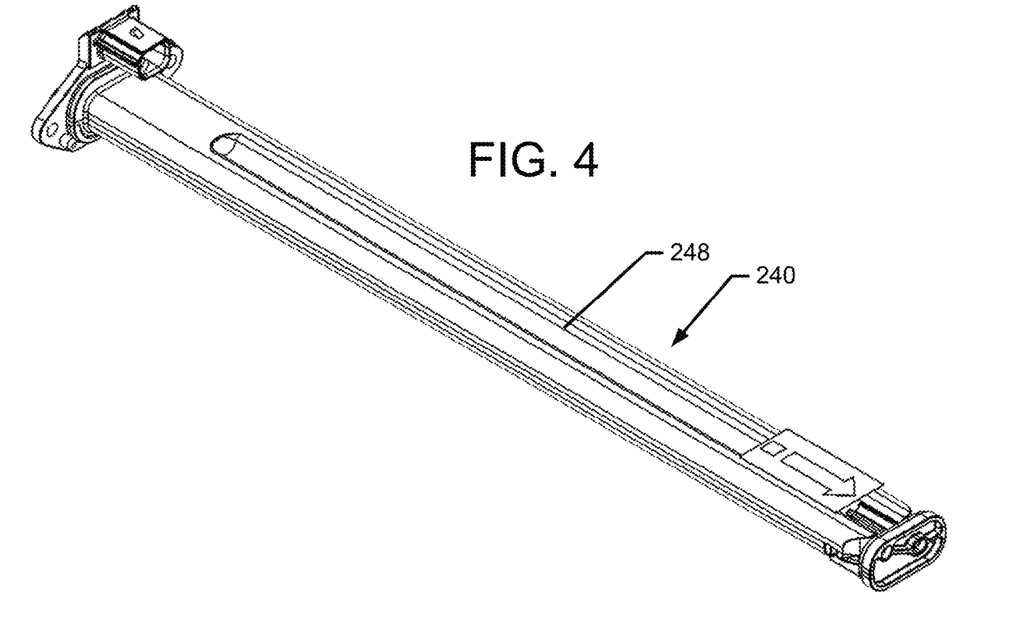
FIG. 4 is an isolated perspective view of a measurement assembly in accordance with an example embodiment.
Figure 5:
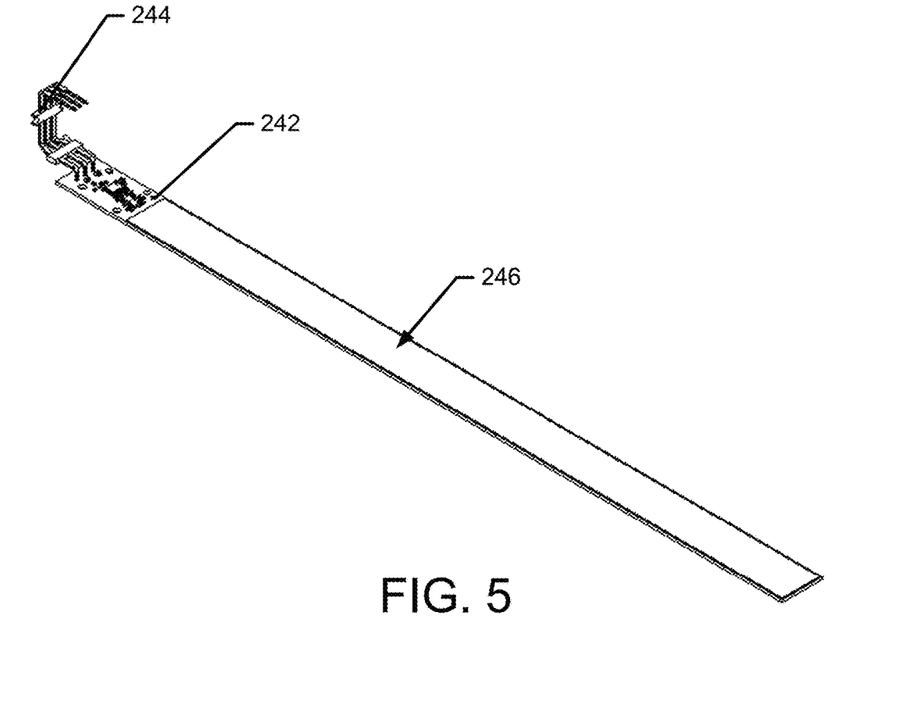
FIG. 5 illustrates a perspective view of an elongated printed circuit board (PCB) for measuring ride height in accordance with an example embodiment.
Figure 6:
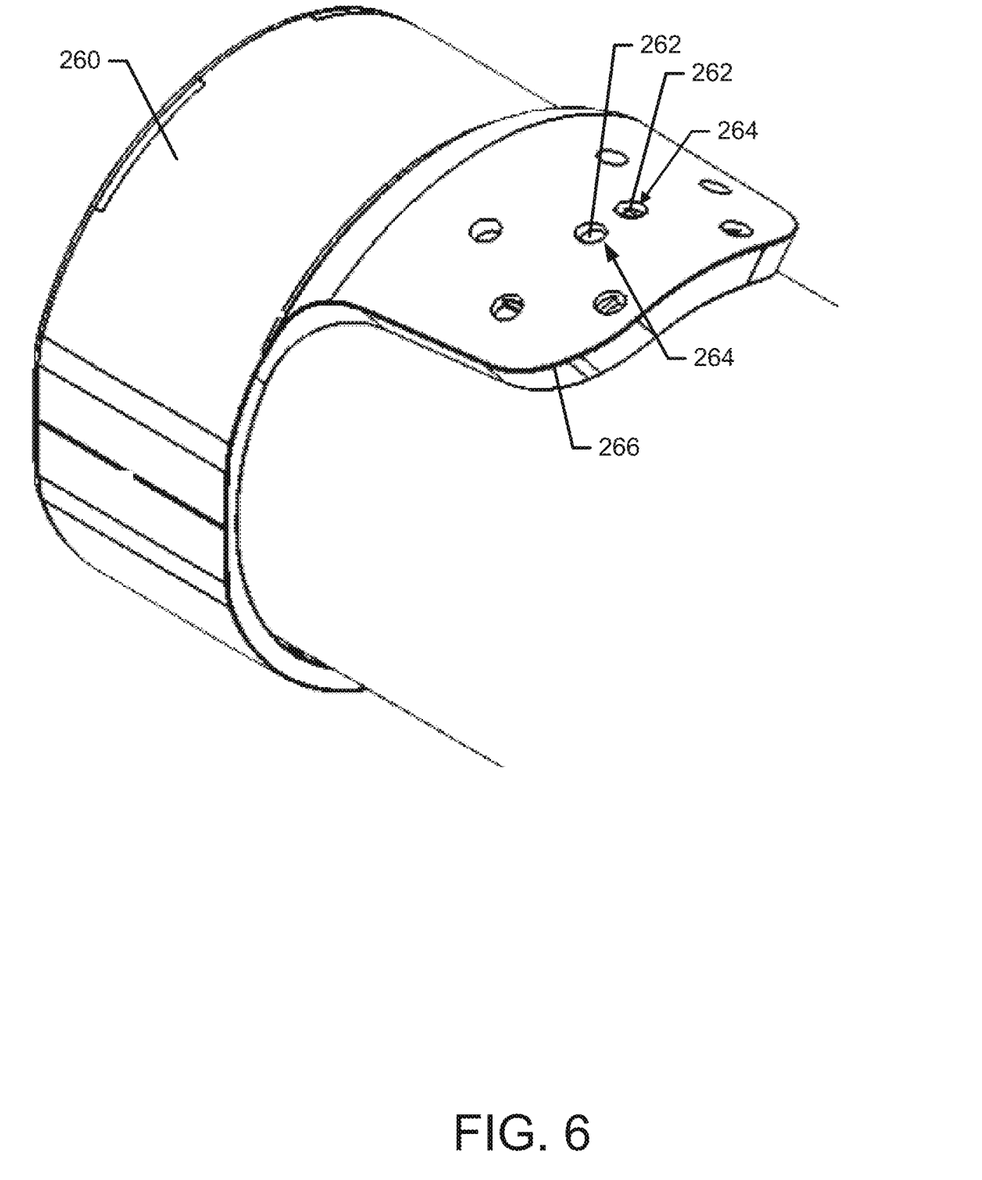
FIG. 6 shows a perspective view of a bump cap in accordance with an example embodiment.
Figure 7:
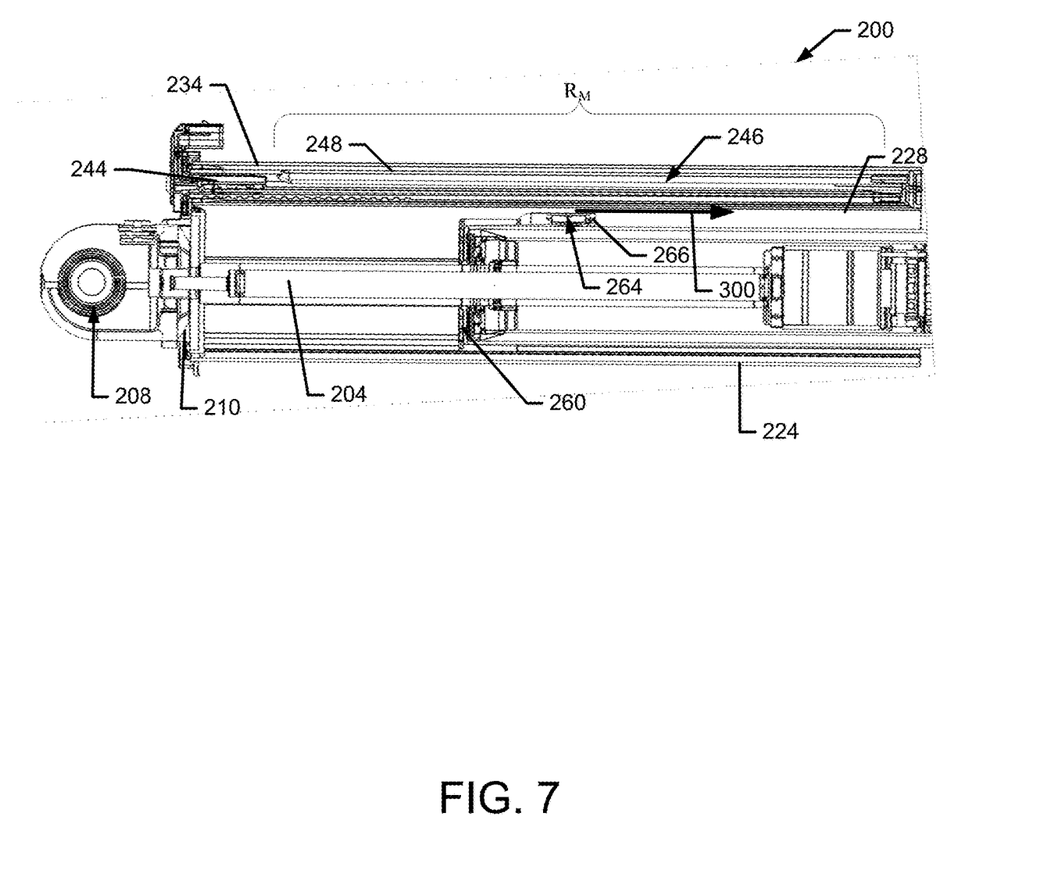
FIG. 7 is a cross section view of a portion of the shock absorber assembly in accordance with an example embodiment.

FIGS. 2-7 illustrate one example structure that may implement the elements discussed above in reference to FIG. 1. In this regard, FIG. 2 illustrates a perspective view of a shock absorber assembly 200 of an example embodiment. FIG. 3 is a partially exploded view of the shock absorber assembly 200 of FIG. 2 with a dust boot 220 (e.g., an example of dust boot 160) removed to expose components otherwise covered by the dust boot 220. FIG. 4 is an isolated perspective view of a measurement assembly 240 (e.g., an example of measurement assembly 180) that may be operably coupled to the dust boot 210. FIG. 5 illustrates a perspective view of a PCB 250 (e.g., an example of the PCB described above in reference to FIG. 1). Meanwhile, FIG. 6 shows a perspective view of a bump cap 260, and FIG. 7 is a cross section view of a portion of the shock absorber assembly 200.

Referring now to FIGS. 2-7, the shock absorber assembly 200 (e.g., an example of damper 110) may include a damper tube 202 with a rod 204 that extends into the damper tube 202. The damper tube 202 may be operably coupled to a wheel (e.g., wheel 130) via a first mechanical interface 206. The rod 204 may be operably coupled to a chassis (e.g., body chassis 120 of FIG. 1) via a second mechanical interface 208. The rod 204 may also be operably coupled to the damper tube 202 in such a way as to resist movement of the rod 204 for jounce and rebound, as described above.

In this example, the rod 204, and/or the second mechanical interface 208 may be further operably coupled to a cap member 210. The cap member 210 may in turn be operably coupled to the dust boot 220 via threaded fasteners 212 (or other fastening means). The dust boot 220 may be formed from a first side member 222, a second side member 224, a third side member 226, and a fourth side member 228, which may form the peripheral sides of the dust boot 220 and define a substantially hollow space therebetween. The first, second, third and fourth side members 222, 224, 226 and 228 may define elongated flat external surfaces, although some (e.g., the first and third side members 222 and 226 in this example) may be slightly curved in the transverse direction. The dust boot 220 may be molded from plastic or composite materials in some cases. The threaded fasteners 212 may be inserted into receivers formed at respective corners defined between adjacent ones of the first, second, third and fourth side members 222, 224, 226 and 228 on a first end 230 of the dust boot 220. Meanwhile, a second end 232 of the dust boot 220 may be enabled to move up and down with rebound and jounce events relative to the damper tube 202.

An elongated compartment 234 may be attached to (or formed integrally with) one of the side members to house the measurement assembly 240. In this example, the elongated compartment 234 is formed to be coextensive with and attached to the fourth side member 228. However, alternative locations could be defined in some cases. The measurement assembly 240 may be retained in the elongated compartment 234 and may thereby be protected from dust and debris. Meanwhile, since the measurement assembly 240 is configured to operate via magnetic or electric field interactions, the physical isolation will otherwise not affect the operation of the measurement assembly 240. Given that sides of the dust boot 220 may be made of materials that do not influence or block magnetic or electric fields, the elongated compartment 234 may be positioned on the outside (e.g., an external surface) of the dust boot 220 thereby providing easier access to the measurement assembly 240 for installation, maintenance or replacement. Connections to external componentry to which the ride height information is provided may also be correspondingly enhanced.

The measurement assembly 240 may include (as shown in FIGS. 4 and 5) a PCB 242 operably coupled to a coupling assembly 244 and a measuring surface 246. The measurement assembly 240 may also include a housing 248 inside which the PCB 242 may be housed. The housing 248 may be about as long as the elongated compartment 234 and may be sized and shaped to fit relatively snugly inside the elongated compartment 234. The coupling assembly 244 may include leads, wires, or other electrical connections to enable the PCB 242 to be operably coupled to external componentry. The PCB 242 may extend nearly as long as the housing 248 (and therefore also the elongated compartment 234). Thus, for example, the PCB 242 may be at least 90% as long as the elongated compartment 234. The PCB 242 may include processing circuitry that enables magnetic/electrical field disruption and/or electrical signals generated based on such disruptions to be calculated or monitored for the purpose of measuring motion (or determining a position) of the rod 204 relative to the damper tube 202. In this regard, the measuring surface 246 may include a wiring assembly (e.g., wiring assembly 182 from FIG. 1) that generates an electric field when a current (e.g., provided from a source via the coupling assembly 244) is run through one side (e.g., a transmit loop) of the wiring assembly and receives the field at another side (e.g., a receive loop) of the wiring assembly. The measuring surface 246 may therefore define a range of motion of the dust boot 220 (and therefore also the measuring surface 246) that can be compared to a fixed reference point on the damper tube 202 to determine ride height information based on the measured changes in the fields caused by the target 170 and measured at the wiring assembly.

The fixed reference point may be defined as the target 170 of FIG. 1. In an example embodiment, the fixed reference point may be disposed on a portion of the bump cap 260 that faces the fourth side member 228 (and consequently also faces the measuring surface 246). In this example, the target 170 of FIG. 1 is embodied as a pair of magnets 262 that are retained in magnet retainers 264 formed in the bump cap 260. The pair of magnets 262 may be spaced apart from each other by, for example, the distance between wires in the wiring assembly in order to maximize interaction between the pair of magnets 262 and the wiring assembly. The PCB 242 may be configured to provide a linear measurement of position change through the range of motion between max jounce and max rebound. In this regard, for example, the measuring surface 246 may act as an inductive sensor, enable measurements in changed resistance or frequency of signals generated in the wiring assembly, and/or directly measure changes in the magnetic field of the wiring assembly based on proximity to the target 170. In other examples, the measuring surface 246 may include a coating that enhances the ability to accurately locate and detect magnetic or electric fields (e.g., to saturation) when proximity is provided to the pair of magnets 262. The position of the target 170 relative to the measuring surface 246 may therefore be determined accordingly by the PCB 242. In some cases, the changes may be linearly changing based on the position of the pair of magnets 262 along the wiring assembly such that ride height information may be linearly also determined. The use of two magnets as opposed to a single magnet, where the pair of magnets 262 are arranged to define a plane perpendicular to the axis of jounce-rebound travel, makes the sensing area larger by creating a larger field. Having a larger area may be helpful to account for possible movement of the dust boot 220, assembly tolerances, and damper top to damper bottom relative rotation that may be experienced in some cases. The structures provided may also allow accurate measurement in the presence of a relatively large, and potentially varying air gap between the target 170 and the PCB 242.

Although not required, in some cases, the magnet retainers 264 may be provided on a tab extension 266 that extends partially down a side of the damper tube 202 proximate the fourth side member 228. The tab extension 266 may enable the pair of magnets 262 to be moved closer to the a center of the measuring surface 246, if not otherwise centered, in order to maximize the amount of travel in both rebound and jounce directions that can be measured.

FIG. 7 illustrates a cross section view taken through an axis of the rod 204 and the damper tube 202. The extension tab 266 can be seen in FIG. 7 to be located such that the magnet retainers 264 (and therefore the target 170 of FIG. 1) are located substantially at a midpoint of the full range of motion ($R_M$) measurable by the PCB 242 and the measuring surface 246. As a jounce event occurs, the rod 204 may be compressed farther into the damper tube 202. Dust boot 220, carried by the cap member 210 and the rod 204, may then move in the direction of arrow 300. As the dust boot 220 moves in the direction of arrow 300, the pair of magnets 262 will be proximate to a different portion of the measuring surface 246 and influence the field generated by the wiring assembly differently. The change in fields or currents associated with the wiring assembly may then be used by the PCB 242 to calculate a precise location of the target 170 (e.g., the pair of magnets 262) along the range of motion ($R_M$) measurable by the PCB 242. The field changes may therefore be converted (e.g., by the PCB 242) into ride height information that can provide real time ride height data for the corresponding wheel or corner of the vehicle to a vehicle suspension system controller or other vehicle control systems. Movement for rebound is substantially opposite the direction of arrow 300 and responses to such movement are correspondingly changed from the descriptions above.

A shock absorber for a vehicle suspension system of an example embodiment may therefore be provided (along with a suspension system including such shock absorber). The shock absorber may include a damper tube defining an axis, a rod operably coupled to the damper tube to be movable along the axis relative to the damper tube in response to jounce and rebound events, a dust boot operably coupled to the rod and extending along peripheral sides of the rod and at least a proximal end of the damper tube relative to the rod, the dust boot being movable with the rod, a target disposed on a damper bump cap operably coupled to the proximal end of the damper tube, and a measurement assembly affixed to the dust boot. The measurement assembly may include a PCB elongated parallel to the axis to track relative movement between the target and the measurement assembly responsive to the jounce and rebound events to generate ride height information based on the relative movement.

The shock absorber of some embodiments may include additional features, modifications, augmentations and/or the like to achieve further objectives or enhance performance of the device. The additional features, modifications, augmentations and/or the like may be added in any combination with each other. Below is a list of various additional features, modifications, and augmentations that can each be added individually or in any combination with each other. For example, the target may include one or more magnets. In an example embodiment, the measurement assembly may include a measuring surface operably coupled to the PCB and coextensive with a portion thereof to define a range of motion over which relative movement between the target and the measuring surface is determinable. In some cases, a wiring assembly may be disposed at the measuring surface and a current may be run through the wiring assembly, and the relative movement may be detected based on the target disrupting the current or an electromagnetic field associated with the wiring assembly. In an example embodiment, the target comprises a first magnet and a second magnet corresponding to a transmit loop of the wiring assembly and a receive loop of the wiring assembly. In some cases, the damper bump cap may include an extension tab extending away from the proximal end, and magnet receptacles may be disposed in the extension tab to receive the first and second magnets. In an example embodiment, the extension tab may be disposed to position the magnet receptacles substantially at a midpoint of the range of motion defined by the measuring surface. In some cases, the dust boot may include an elongated compartment attached to one peripheral side of the dust boot, and the measurement assembly may be disposed in the elongated compartment. In an example embodiment, the elongated compartment may be approximately equal in length to a length of the dust boot, and the PCB may be at least 90% as long as the elongated compartment. In some cases, the measurement assembly may be disposed at an external surface of the dust boot.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

That which is claimed:

1. A shock absorber of a vehicle suspension system, the shock absorber comprising:
   a damper tube defining an axis;
   a rod operably coupled to the damper tube to be movable along the axis relative to the damper tube in response to jounce and rebound events;
   a dust boot operably coupled to the rod and extending along peripheral sides of the rod and at least a proximal end of the damper tube relative to the rod, the dust boot being movable with the rod;
   a target disposed on a damper bump cap operably coupled to the proximal end of the damper tube, the target comprising a magnet; and
   a measurement assembly affixed to the dust boot, the measurement assembly comprising a printed circuit board (PCB) elongated parallel to the axis to track relative movement between the target and the measurement assembly responsive to the jounce and rebound events to generate ride height information based on the relative movement;
   wherein the measurement assembly comprises a measuring surface operably coupled to the PCB to define a range of motion over which relative movement between the target and the measuring surface is determinable;
   wherein a wiring assembly is disposed at the measuring surface and a current is run through the wiring assembly;
   wherein the relative movement is detected based on the target disrupting the current that is run through the wiring assembly; and
   wherein the magnet is a first magnet, and the target comprises the first magnet and a second magnet corresponding to a transmit loop of the wiring assembly and a receive loop of the wiring assembly.

2. The shock absorber of claim 1, wherein the dust boot comprises an elongated compartment attached to one peripheral side of the dust boot, and
   wherein the measurement assembly is disposed in the elongated compartment.

3. The shock absorber of claim 2, wherein the elongated compartment is approximately equal in length to a length of the dust boot, and wherein the PCB is at least 90% as long as the elongated compartment.

4. The shock absorber of claim 1, wherein the measurement assembly is disposed at an external surface of the dust boot.

5. A shock absorber of a vehicle suspension system, the shock absorber comprising:
   a damper tube defining an axis;
   a rod operably coupled to the damper tube to be movable along the axis relative to the damper tube in response to jounce and rebound events;
   a dust boot operably coupled to the rod and extending along peripheral sides of the rod and at least a proximal end of the damper tube relative to the rod, the dust boot being movable with the rod;
   a target disposed on a damper bump cap operably coupled to the proximal end of the damper tube; and
   a measurement assembly affixed to the dust boot, the measurement assembly comprising a printed circuit board (PCB) elongated parallel to the axis to track relative movement between the target and the measurement assembly responsive to the jounce and rebound events to generate ride height information based on the relative movement;
   wherein the measurement assembly comprises a measuring surface operably coupled to the PCB and coextensive with a portion thereof to define a range of motion over which relative movement between the target and the measuring surface is determinable;
   wherein a wiring assembly is disposed at the measuring surface and a current is run through the wiring assembly;
   wherein the target comprises a first magnet and a second magnet corresponding to a transmit loop of the wiring assembly and a receive loop of the wiring assembly.

6. The shock absorber of claim 5, wherein the damper bump cap comprises an extension tab extending away from the proximal end, and
   wherein magnet receptacles are disposed in the extension tab to receive the first and second magnets.

7. The shock absorber of claim 6, wherein the extension tab is disposed to position the magnet receptacles substantially at a midpoint of the range of motion defined by the measuring surface.

8. A suspension system for a vehicle, the suspension system comprising:
   a chassis;
   a wheel; and
   a shock absorber operably coupling the chassis and the wheel,
   wherein the shock absorber comprises:
      a damper tube operably coupled to the wheel and defining an axis;
      a rod operably coupled to the chassis and the damper tube to be movable along the axis relative to the damper tube in response to jounce and rebound events;
      a dust boot operably coupled to the rod and extending along peripheral sides of the rod and at least a proximal end of the damper tube relative to the rod, the dust boot being movable with the rod;
      a target disposed on a damper bump cap operably coupled to the proximal end of the damper tube, the target comprising a magnet; and
      a measurement assembly affixed to the dust boot, the measurement assembly comprising a printed circuit board (PCB) elongated parallel to the axis to track relative movement between the target and the measurement assembly responsive to the jounce and rebound events to generate ride height information based on the relative movement;
   wherein the measurement assembly comprises a measuring surface operably coupled to the PCB to define a range of motion over which relative movement between the target and the measuring surface is determinable;
   wherein a wiring assembly is disposed at the measuring surface and a current is run through the wiring assembly; and
   wherein the relative movement is detected based on the target disrupting the current that is run through the wiring assembly;
   wherein the magnet is a first magnet and the target comprises the first magnet and a second magnet corresponding to a transmit loop of the wiring assembly and a receive loop of the wiring assembly.

9. The suspension system of claim 8, wherein the damper bump cap comprises an extension tab extending away from the proximal end, and
   wherein magnet receptacles are disposed in the extension tab to receive the first and second magnets.

10. The suspension system of claim 9, wherein the extension tab is disposed to position the magnet receptacles substantially at a midpoint of the range of motion defined by the measuring surface.

11. The suspension system of claim 8, wherein the dust boot comprises an elongated compartment attached to one peripheral side of the dust boot, and
   wherein the measurement assembly is disposed in the elongated compartment.

12. The suspension system of claim 11, wherein the elongated compartment is approximately equal in length to a length of the dust boot, and wherein the PCB is at least 90% as long as the elongated compartment.

13. The suspension system of claim 8, wherein the measurement assembly is disposed at an external surface of the dust boot.

* * * * *